US012705316B2

(12) United States Patent
Kashyap et al.

(10) Patent No.: US 12,705,316 B2
(45) **Date of Patent: *Aug. 11, 2026**

(54) GEO-FENCING OF AN APPLICATION FOR A SECURE CRYPTOGRAPHIC ENVIRONMENT

(71) Applicant: Fortanix, Inc., Santa Clara, CA (US)

(72) Inventors: Anand Kashyap, Los Altos, CA (US); Ambuj Kumar, Sunnyvale, CA (US)

(73) Assignee: Fortanix, Inc., Santa Clara, CA (US)

( * ) Notice: Subject to any disclaimer, the term of this patent is extended or adjusted under 35 U.S.C. 154(b) by 180 days.

This patent is subject to a terminal disclaimer.

(21) Appl. No.: 18/807,169

(22) Filed: Aug. 16, 2024

(65) Prior Publication Data

US 2024/0411842 A1 Dec. 12, 2024

Related U.S. Application Data

(63) Continuation of application No. 16/841,970, filed on Apr. 7, 2020, now Pat. No. 12,086,217.

(51) Int. Cl.

| | |
|---|---|
| ***G06F 21/12*** | (2013.01) |
| ***H04L 9/40*** | (2022.01) |
| ***H04W 4/021*** | (2018.01) |
| ***H04W 4/029*** | (2018.01) |

(52) U.S. Cl.

CPC .......... *G06F 21/12* (2013.01); *H04L 63/0823* (2013.01); *H04W 4/021* (2013.01); *H04W 4/029* (2018.02); *G06F 2221/2149* (2013.01)

(58) Field of Classification Search

CPC .................. G06F 21/12; G06F 21/602; G06F 2221/2107; G06F 2221/2111; G06F 2221/2149; H04L 63/0209; H04L 63/0823; H04W 4/021; H04W 4/029

See application file for complete search history.

(56) References Cited

U.S. PATENT DOCUMENTS

| | | | | |
|---|---|---|---|---|
| 10,104,097 | B1 * | 10/2018 | Yumer | H04L 63/20 |
| 2012/0047266 | A1 * | 2/2012 | Minert | G06F 9/5072 709/226 |
| 2015/0254451 | A1 * | 9/2015 | Doane | G06F 21/44 726/1 |
| 2015/0379259 | A1 * | 12/2015 | Mohammed | H04L 63/08 726/6 |

(Continued)

OTHER PUBLICATIONS

Cull, Ben, "Creating a Self-Signed Certificate for Identity Server and Azure", Ben Cull's Blog, https://benjii.me/2017/06/creating-self-signed-certificate-identity-server-azure/ (Jun. 9, 2017) (Year: 2017).

(Continued)

*Primary Examiner* — Theodore C Parsons

(74) *Attorney, Agent, or Firm* — Lowenstein Sandler LLP

(57) ABSTRACT

A request to execute an application at a secure cryptographic environment of a server may be received. A tag that has been assigned to the application may be received. An attribute of the server may be identified. A determination may be made as to whether the attribute of the server satisfies the tag that has been assigned to the application. In response to determining that the attribute of the server satisfies the tag that has been assigned to the application, an indication may be provided to execute the application at the secure cryptographic environment of the server.

20 Claims, 5 Drawing Sheets

(56) References Cited

U.S. PATENT DOCUMENTS

2016/0092266 A1* 3/2016 Bavishi ................. G06F 9/5016 718/1
2017/0279890 A1* 9/2017 Borlick ................... H04L 67/51
2019/0036975 A1* 1/2019 Beckman .............. H04L 67/565
2021/0034546 A1* 2/2021 Li ....................... G06F 13/1668

OTHER PUBLICATIONS

Thomas, Orin, "How to Create a Self Signed Certificate in Azure using Cloud Shell," Microsoft ITOps Talk Blog, https://techcommunity.microsoft.com/t5/itops-talk-blog/how-to-create-a-self-signed-certificate-in-azure-using-cloud/ba-p/ 401403 (Apr. 30, 2019) (Year: 2019).

* cited by examiner

GEO-FENCING OF AN APPLICATION FOR A SECURE CRYPTOGRAPHIC ENVIRONMENT

CROSS-REFERENCE TO RELATED APPLICATIONS

This application is a continuation of U.S. patent application Ser. No. 16/841,970, filed Apr. 7, 2020, which is hereby incorporated in its entirety herein by reference.

TECHNICAL FIELD

Aspects of the present disclosure relate generally to geo-fencing, and more specifically, relate to geo-fencing of an application for a secure cryptographic environment.

BACKGROUND

An application may be provided at a server. For example, the application may be provisioned or executed at a particular server in a group of servers (e.g., a data center). Servers can be located in different physical locations or be associated with other characteristics. A user of the application may further seek to execute the application at a particular server in a particular location or is associated with a particular characteristic. For example, the user may provision the application at the server that satisfies the location or characteristic that is of importance to the user.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
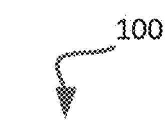
FIG. 1 illustrates an example environment to provide geo-fencing of an application for a secure cryptographic environment in accordance with some embodiments.
Figure 1:
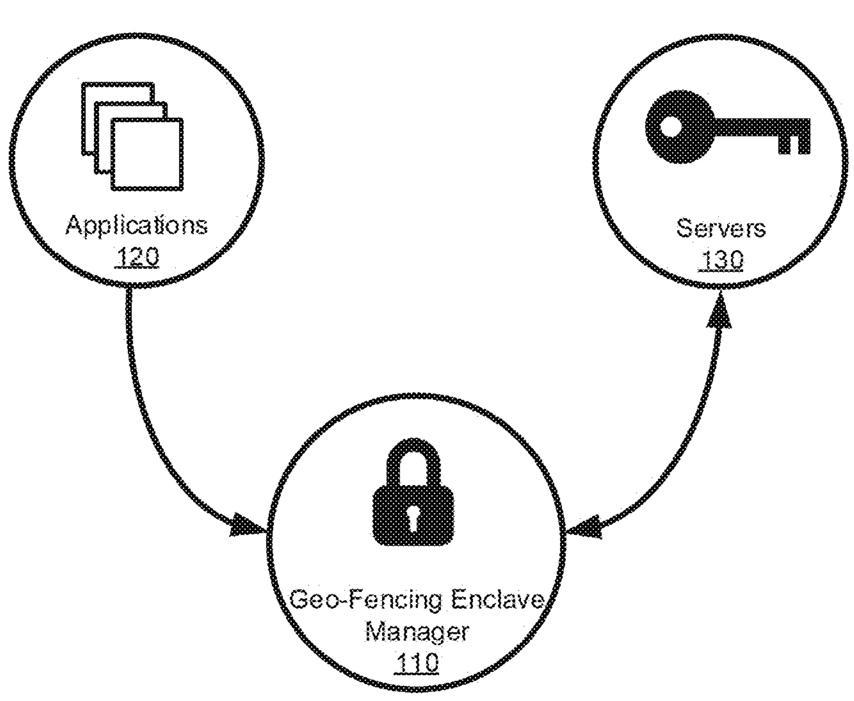

Aspects of the present disclosure relate to geo-fencing of an application for a secure cryptographic environment. A data center or network cluster may include multiple network servers where each network server may execute or provide one or more applications. The applications may be provided at a secure computation environment of the servers. For example, the secure computation environment can be a secure enclave. As described in further detail below, a secure enclave can correspond to an address space of a memory that is encrypted by a cryptographic key that is internal to a processor associated with the memory.

The servers of the data center or network cluster can have different attributes or other such properties. For example, servers can be located in different geographical locations or have other such attributes such as different security settings (e.g., particular firewall settings, encryption of data, etc.). A user of an application may seek to establish a policy where the application can be executed at a server that satisfies certain constraints. For example, the user of the application may seek to execute the application at a server that is located in a specific geographical location. In some embodiments, the user may specify a policy for the application and an administrator of the data center or network cluster can select the server that is to execute the application. For example, a particular server that satisfies the policy of the application may be selected to execute the application. As such, the enforcement of the policy is based on trusting the administrator to accurately follow the policies that have been specified for applications.

Aspects of the present disclosure address the above and other deficiencies by enforcing the execution of applications at a secure cryptographic environment of a server. For example, aspects may relate to enforcing the execution of applications based on geo-fencing policies of the applications. In some embodiments, the geo-fencing policy may specify a specific geographical location that a server that executes the application is to be located in. A user of the application can specify the policy or other such rules for the application based on cryptographic identities of the application and available servers that include a secure cryptographic environment. For example, a geo-fencing enclave manager may be provided at a server of the data center or network cluster. The geo-fencing enclave manager may receive notifications of servers that provide a secure cryptographic environment as well as a cryptographic identity and other such information of the secure cryptographic environments provided by the servers. When the application is provided to the geo-fencing enclave manager, one or more tags may be specified for the application. In some embodiments, the tags may specify a geographical location from which the application is to be executed.

At a later point, a user may request that the application be executed at a particular server of the data center or network cluster. In response, the geo-fencing enclave manager may automatically perform a verification of the policy or tags that were assigned to the application. If the server satisfies the tags that have been assigned to the application (e.g., the server is in a geographical location that corresponds to a tag assigned to the application), then the geo-fencing enclave manager may allow the application to be executed at the secure cryptographic environment of the server. For example, a certificate may be issued to the application where the application utilizes the certificate when being executed.

Advantages of the present disclosure include, but are not limited to, the improved security of applications that are executed at a data center. For example, since the application is not allowed to be executed at a server if the server providing the application does not satisfy the tags or policies assigned to the application, then the application and underlying data may not be allowed to be used in an unauthorized environment.

FIG. 1 illustrates an example environment 100 to provide geo-fencing of an application for a secure cryptographic environment in accordance with some embodiments. In general, a computing environment may correspond to a data center or network cluster that includes multiple servers. For example, a server may provide the geo-fencing enclave manager 110 that is used to manage secure cryptographic environments (e.g., secure enclaves) that are provided at other servers 130. The geo-fencing enclave manager 110 may further manage applications 120 that are to be executed or provided at the servers 130 of the data center or network cluster.

As shown in FIG. 1, one or more applications 120 can be provided to be executed at a data center or network cluster. The applications 120 can be provided by users of the data center. For example, users can provide applications to the geo-fencing enclave manager 110 where the applications can be executed within a secure cryptographic environment of the servers 130. In some embodiments, a user may provide the applications 120 to be executed within the secure cryptographic environment. In the same or alternative embodiments, the software code of an application may be received and the application may be converted to run within the secure cryptographic environment. For example, a container wrapper may be generated for the application when the application is received to be made available for secure cryptographic environments at the data center. The container wrapper may be used to convert the application to be able to operate within the secure cryptographic environment. In some embodiments, the application may be prebuilt to run within the secure cryptographic environment. Thus, the geo-fencing enclave manager 110 may receive and manage multiple applications that are to be available to run within the secure cryptographic environments of servers 130 at the data center. A user of the application can further provide tags or policies that specify required characteristics or attributes (e.g., a geographical location) for the application as described in further detail with respect to FIG. 2. For example, a tag can specify an attribute or characteristic of a server that is required for the application to execute at the secure cryptographic environment of the server.

The geo-fencing enclave manager 110 may further manage the secure cryptographic environments of the servers 130. For example, nodes (e.g., the secure enclaves or secure cryptographic environments) may be enrolled with the geo-fencing enclave manager. Enrolling the node may make the corresponding secure cryptographic environment available for executing applications. Thus, the geo-fencing enclave manager 110 may manage multiple nodes where applications can be executed at the nodes. As described in further detail with respect to FIG. 3, the geo-fencing enclave manager 110 may use the tags assigned to an application to determine whether the application can be executed at a particular secure cryptographic environment.

In operation, the geo-fencing enclave manager 110 may provide a graphical user interface that is used to manage the applications 120 and servers 130. For example, as previously described, applications may be provided to the geo-fencing enclave manager 110 so that the applications may be available to be executed at the data center. The geo-fencing enclave manager 110 may provide a display of each different application that has been provided. For example, the geo-fencing enclave manager 110 may identify each application that has been converted or is configured to operate within a secure cryptographic environment. In some embodiments, the graphical user interface may provide an identity of each application, a hash value of the software code of the application, a cryptographic signature of an entity that has signed the application, an independent software vendor identification, product identification, version number of the application, etc. A user may further specify tags for each application as further described below.

Furthermore, the geo-fencing enclave manager 110 may provide another graphical user interface that identifies each node (e.g., secure cryptographic environment of each server) that has been enrolled. In some embodiments, the graphical user interface may specify whether the node is active or is not active (e.g., whether the node is currently available to execute applications), a number of applications currently being executed at each node, a version of the secure cryptographic environment provided at each node, a unique cryptographic identity of the node (e.g., based on an internal cryptographic key of a processor), and when attestation of the node was received. In some embodiments, the unique cryptographic identity of the node may be based on a cryptographic key that is internal to a processor or processing device of the node. The attestation of the node may correspond to information that verifies that the node includes a secure cryptographic environment. For example, the attestation may verify that a secure cryptographic environment is currently being provided by the processor of a particular server. In some embodiments, the graphical user interface may identify each server that is currently provided at the data center and may indicate whether a server includes a secure cryptographic environment. In some embodiments, the graphical user interface may identify a number of secure cryptographic environments that are available at each of the servers.

Figure 2:
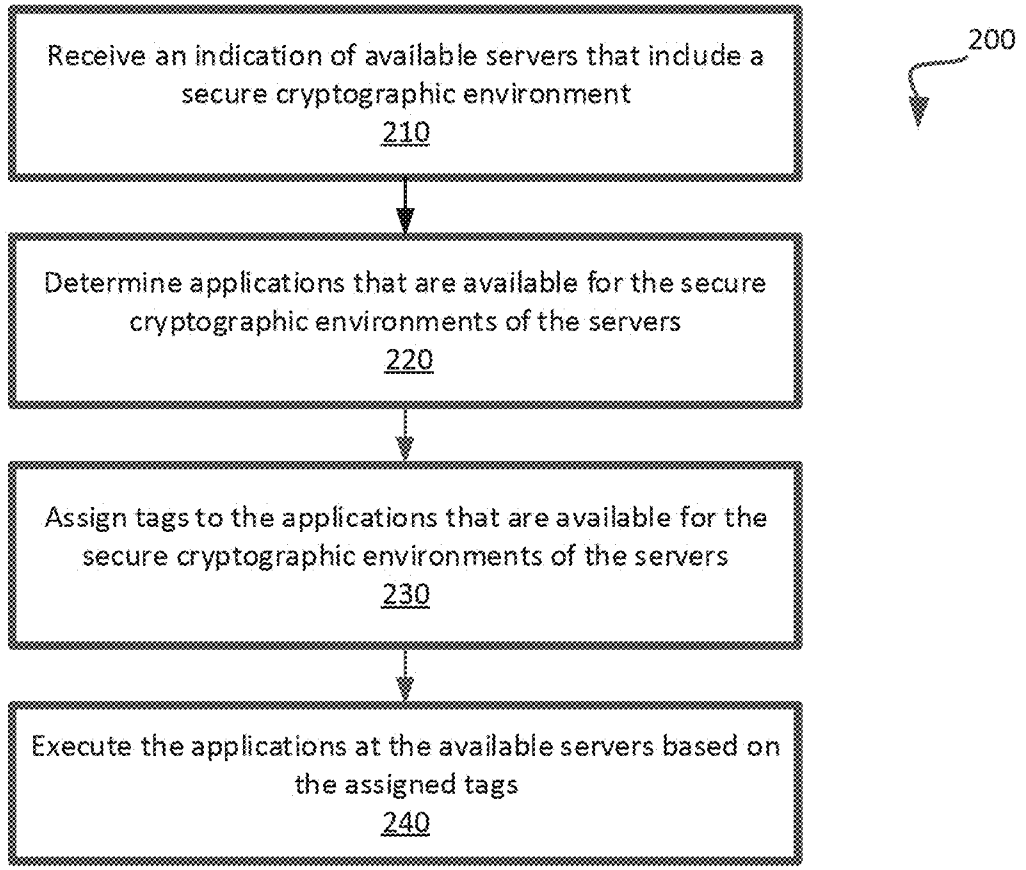
FIG. 2 illustrates a flow diagram of an example method to assign tags to an application to be executed in a secure cryptographic environment in accordance with some embodiments of the present disclosure.

FIG. 2 illustrates a flow diagram of an example method 200 to assign tags to an application to be executed in a secure cryptographic environment in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the geo-fencing enclave manager 110 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 2, at operation 210, the processing logic may receive an indication of available servers that include a secure cryptographic environment. For example, servers that include one or more secure cryptographic environments may be enrolled to be available for executing applications. The secure cryptographic environment can be a secure enclave that corresponds to a portion of a memory that is assigned to the secure enclave where the portion of the memory is encrypted and decrypted by a cryptographic key that is internal to a processor or processing device as further described with respect to FIG. 4. In some embodiments, multiple servers may be identified and a subset (e.g., a proper subset) of the servers that include a secure cryptographic environment may be considered to be available servers. In some embodiments, available servers may be servers that are not currently executing any application in a secure cryptographic environment or may be servers that are currently executing an application in a secure cryptographic environment at a workload that can allow the execution of another application in another secure cryptographic environment available at the server. For example, a secure cryptographic environment can be considered to be available to execute another application if the workload of the secure cryptographic environment satisfies a threshold condition (e.g., the workload is below a threshold workload).

At operation 220, the processing logic may determine applications that are available for the secure cryptographic environments of the servers. For example, applications that are available to be executed at a secure cryptographic environment of a server may be identified. The applications may be software code that are configured to execute within the secure cryptographic environment. Examples of the applications include, but are not limited to, At operation 230, the processing logic may assign tags to the applications that are available for the secure cryptographic environments of the servers. For example, the tags may be assigned to individual applications via a graphical user interface as previously described. In some embodiments, a tag may specify a geographical location (e.g., a country). In the same or alternative embodiments, a tag may specify security settings, firewall network settings, encryption or decryption settings for the application or data used by the application, a geographical location from which the application is to execute, a minimum version or software version of a secure cryptographic environment that is to execute the application, or any other condition or characteristic of the operating environment of a server. Multiple different tags may be assigned to any number of applications that are available to be executed at the secure cryptographic environments.

At operation 240, the processing logic may execute the applications at the available servers based on the assigned tags. For example, an application may be allowed to execute at the secure cryptographic environment of a server if the characteristics or attributes of the server satisfies the tags that have been assigned to the application. For example, if a tag is a geo-fencing tag that specifies a geographical location of a server, then the application may be executed at a server that is located at the geographical location and the application may not be executed at a server that is not located at the geographical location.

In some embodiments, a user may provide a request to execute a particular application at a particular server. In response to the request, an attestation request may be transmitted to an attestation server. An attestation result may be received where the attestation result specifies that the application has been signed by a particular entity, the application has requested attestation from a server with a secure cryptographic environment that includes a unique cryptographic identity (e.g., based on an internal cryptographic key of a processor), a version number of the secure cryptographic environment, an identification of the processor or processing device that has provided the secure cryptographic environment, etc. The application may provide the attestation result to the geo-fencing enclave manager which may verify that the server that is providing the secure cryptographic environment satisfies the tags that were previously assigned to the application. If the server satisfies the tags that have been assigned to the application, then the application may be allowed to continue to execute at the server. Otherwise, if the server does not satisfy the tags that have been assigned to the application, then the application may not be allowed to continue to execute at the server. Further details with respect to allowing the application to continue to execute are described in conjunction with FIG. 3.

Figure 3:
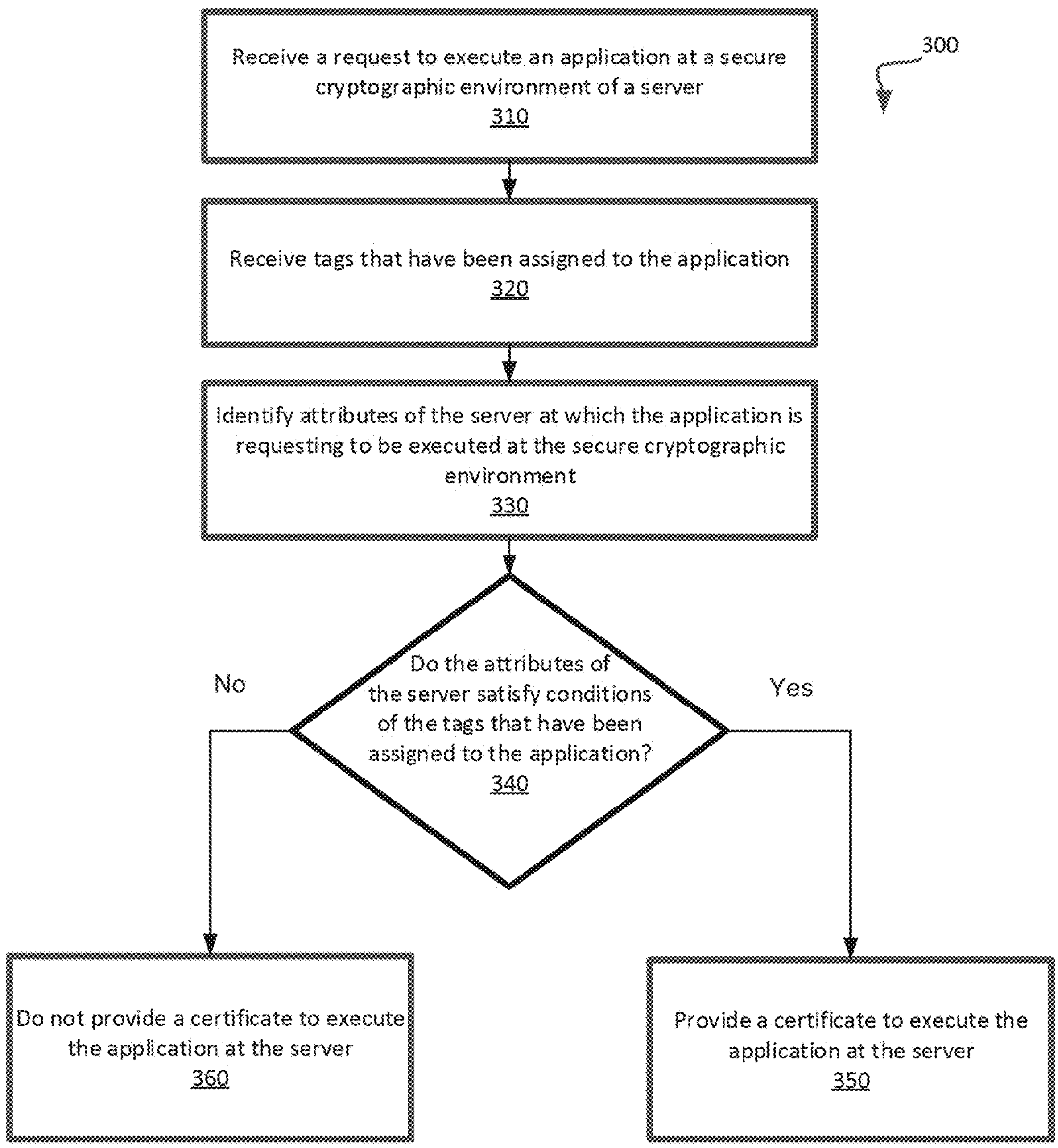
FIG. 3 illustrates a flow diagram of an example method to execute an application in a secure cryptographic environment in accordance with some embodiments of the present disclosure.

FIG. 3 illustrates a flow diagram of an example method 300 to execute an application in a secure cryptographic environment in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the geo-fencing enclave manager 110 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 3, at operation 310, the processing logic may receive a request to execute an application at a secure cryptographic environment of a server. For example, an application may be initially executed or started at a secure enclave provided by a processor of the server. At operation 320, the processing logic may receive tags that have been assigned to the application. For example, characteristics or attributes of a server that can be used to execute the application can be received as previously described. At operation 330, the processing logic identifies attributes of the server at which the application is requesting to be executed at the secure cryptographic environment. For example, a data structure may identify each available server of a data center and various attributes or characteristics of each of the servers. In some embodiments, the attributes of the server may be the geographical location of the server. At operation 340, the processing logic may determine whether the attributes of the server satisfy conditions of the tags that have been assigned to the application. For example, the tags may specify a particular geographical location of a server that is to be used for the application, or any other characteristic or attribute that is required of a server to execute the application. In some embodiments, the processing logic may further determine whether the server satisfies any other policy specified for the application. In some embodiments, a hash value of the requested application may also be verified. For example, the processing logic may retrieve a data structure that includes hash values of the software code of multiple applications that have been previously received and for which tags have been assigned. The hash value may be signed by the application and the geo-fencing enclave manager may verify the signature and may compare the hash value with the known hash values of applications that have been previously tagged. If the hash values match and the server satisfies the tags, then the application may be allowed to execute at the server.

At operation 350, in response to the attributes of the server satisfying the conditions of the tags that have been assigned to the application, the processing logic may provide a certificate to execute the application at the server. The certificate may include information that is used by the application to continue to be executed at the server. For example, the certificate may include a cryptographic key that is used by the application to communicate with the data center. In some embodiments, the certificate may be a Transport Layer Security (TLS) certificate that includes information identifying an owner of a public key (e.g., the geo-fencing enclave manager) as well as the public key. At operation 360, in response to the attributes of the server not satisfying the conditions of the tags that have been assigned to the application, the processing logic may not provide a certificate to execute the application at the server. For example, the processing logic may determine to not provide the certificate when the server does not satisfy the tags that have been assigned to the application. In some embodiments, the application will terminate after a defined amount of time.

Figure 4:
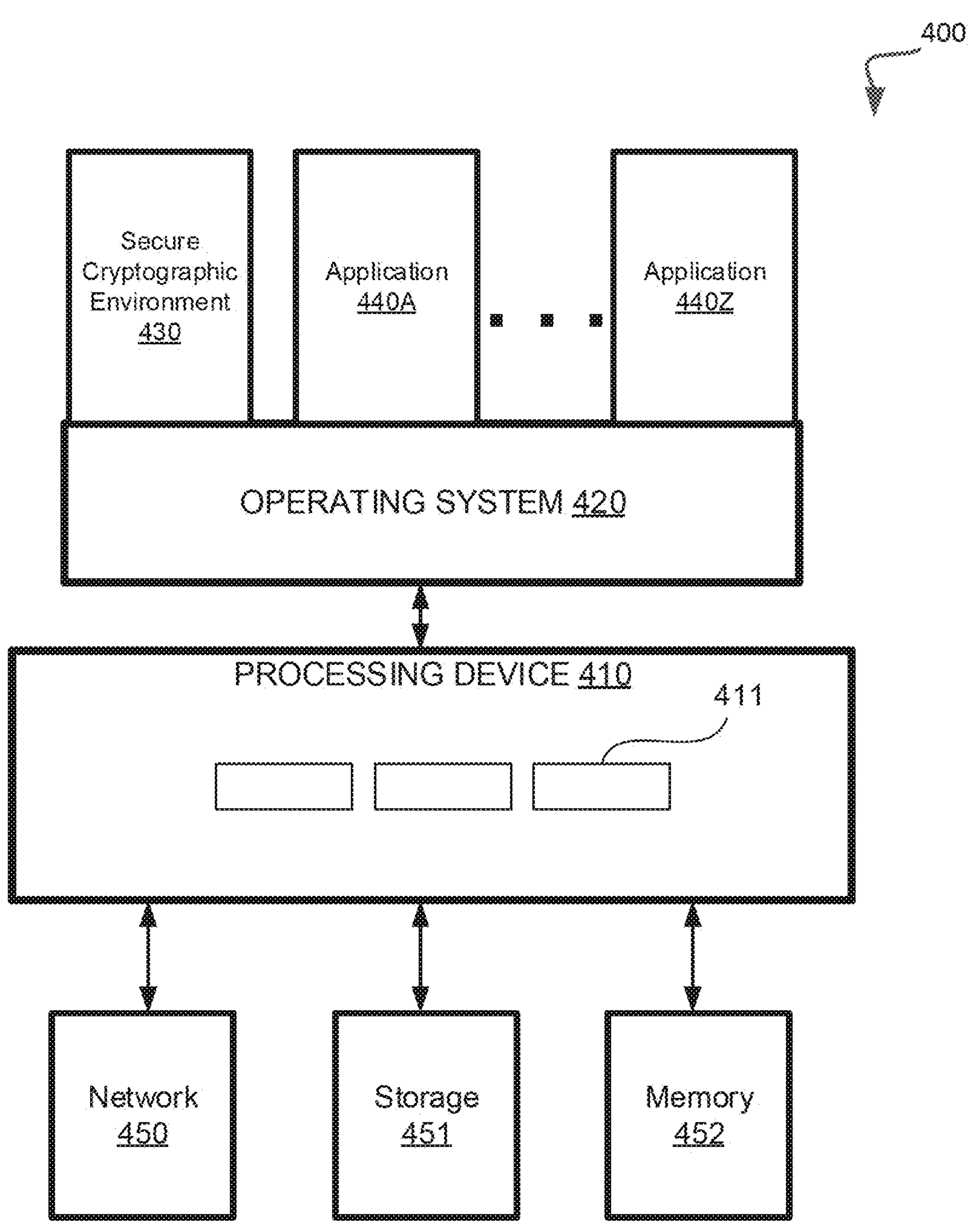
FIG. 4 illustrates an example network server with a secure cryptographic environment to execute an application in accordance with some embodiments of the present disclosure.

FIG. 4 illustrates an example network server 400 with a secure cryptographic environment 430 to execute an application. In general, a secure cryptographic environment 430 may be hosted by a network server along with one or more other applications 440A to 440Z that are also hosted by the network server or another network server. The secure cryptographic environment 430 may be managed by the geo-fencing enclave manager 120 of FIG. 1.

As shown in FIG. 4, the network server 400 may include a processing device 410 that may execute an operating system 420. Furthermore, the processing device 410 may include one or more internal cryptographic keys 411 that may be used to encrypt and decrypt data stored in a portion of a memory that is assigned to a secure enclave of the secure cryptographic environment 430. As previously described, the access to the data of the secure cryptographic environment 430 in the secure enclave may be protected from the one or more applications 440A to 440Z and the operating system 420. For example, the access to the data of the secure enclave corresponding to the secure cryptographic environment 430 may be protected by the use of one of the internal cryptographic keys 411 that are internal to the processing device 410 so that the access to the data is based on a hardware access as opposed to a software access. The operating system 420 may be associated with a first privilege level and the secure cryptographic environment 430 and the applications 440A to 440Z may be associated with a second privilege level where the first privilege level of the operating system is more privileged than the second privilege level of the various applications that are run on the operating system 420 (e.g., the more privileged level allows access to more resources of the network server than the less privileged level). Thus, the operating system 420 may be allowed access to resources of the applications 440A to 440Z. However, since the secure cryptographic environment 430 is assigned to a secure enclave where access to the data of the secure enclave is based on the use of an internal cryptographic key 411 of the processing device 411, the operating system 420 may not be able to access the data of the secure cryptographic environment 430 despite having a more privileged level of access than the secure cryptographic environment 430.

In operation, the secure cryptographic environment 430 may be hosted on the network server 400. An attestation procedure may be performed to authenticate the secure cryptographic environment 430. After the secure cryptographic environment 430 has been authenticated, a connection may be considered to be established between the geo-fencing enclave manager and the secure cryptographic environment 430. Since the secure cryptographic environment 430 is assigned to a secure enclave, the data of the secure cryptographic environment 430 may be encrypted and protected by the use of an internal cryptographic key 411 (i.e., an internal key) of the processing device 410. In some embodiments, the secure cryptographic environment 430 may transmit identification information of the secure cryptographic environment 430 to the processing device 410 for the processing device 410 to execute an application within the secure cryptographic environment. The processing device 430 may use an instruction to use one of its internal cryptographic keys 411 that is based on the identification of the secure cryptographic environment 430 to store the data of the application in the memory of the secure enclave of the secure cryptographic environment 430. For example, the data may be securely (e.g., encrypted) stored in the storage 451 or memory 452 associated with the processing device 410 or at another storage resource over a network 450.

In some embodiments, the internal cryptographic key 411 may be combined with additional information (e.g., the identification information of the secure cryptographic environment 430) to generate a secure enclave key for the secure cryptographic environment 430 that is used to decrypt and/or encrypt data associated with the secure cryptographic environment 430. Thus, since the processing device 410 uses its internal cryptographic key 411 to decrypt data and to perform the operations of an application, the data of an application executed at the secure cryptographic environment may not be exposed external to the processing device 410.

Figure 5:
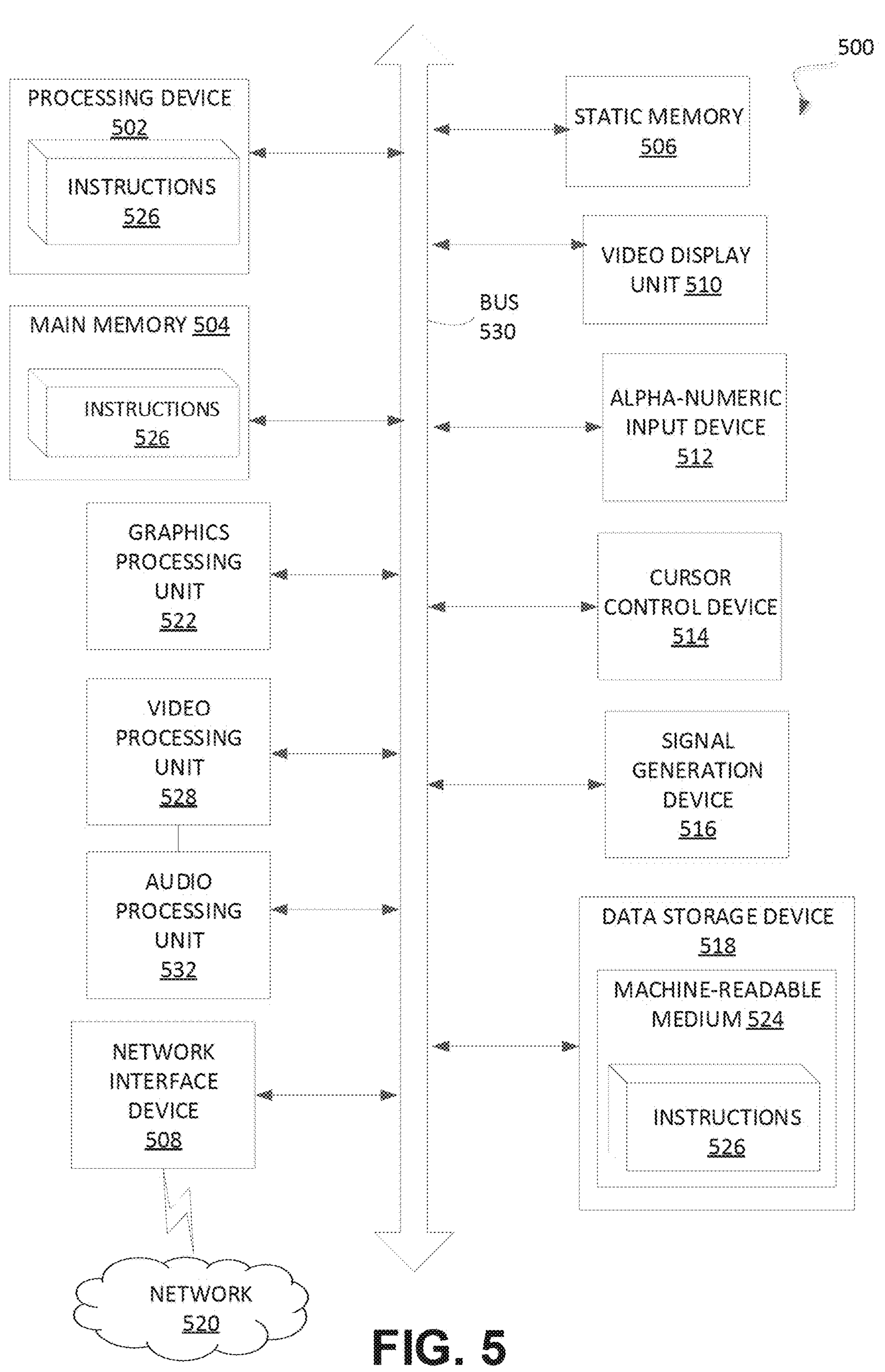
FIG. 5 illustrates an example computer system in which embodiments of the present disclosure operate.

FIG. 5 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein.

The computer system 500 may further include a network interface device 508 to communicate over the network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), a graphics processing unit 522, a signal generation device 516 (e.g., a speaker), graphics processing unit 522, video processing unit 528, and audio processing unit 532.

The data storage device 518 may include a machine-readable storage medium 524 (also known as a computer-readable medium) on which is stored one or more sets of instructions or software 526 embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting machine-readable storage media.

In one implementation, the instructions 526 include instructions to implement functionality corresponding to a geo-fencing enclave manager. While the machine-readable storage medium 524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:

enrolling, at an enclave manager, a secure enclave of a server, wherein the enclave manager manages a plurality of enrolled secure enclaves, and wherein one or more secure enclaves of the plurality of enrolled secure enclaves are available for executing applications;

receiving, via a graphical user interface of the enclave manager, a request to execute an application at the secure enclave of the server, wherein the graphical user interface comprises:

a respective identifier of each of the plurality of enrolled secure enclaves, a respective identifier of each of one or more applications that are available to be executed by the one or more secure enclaves of the plurality of enrolled secure enclaves, and a respective geographical location tag corresponding to each of the one or more applications;

receiving, via the graphical user interface, an indication of a geographical location tag associated with the application;

determining whether an attribute of the server satisfies the geographical location tag associated with the application; and in response to determining that the attribute of the server satisfies the geographical location tag associated with the application, providing, by the enclave manager, an indication to execute the application at the secure enclave of the server.

2. The method of claim 1, wherein determining whether the attribute of the server satisfies the geographical location tag associated with the application comprises:

determining a geographical location of the server based on the attribute of the server; and determining whether the geographical location of the server matches the geographical location corresponding to the geographical location tag.

3. The method of claim 1, wherein providing the indication to execute the application at the secure enclave of the server comprises:

providing a certificate to the application, the certificate comprising an identity of the enclave manager and a public key associated with the enclave manager.

4. The method of claim 1, further comprising:

prior to receiving the request to execute the application at the secure enclave of the server, receiving the application at the enclave manager; and modifying the application to be compatible with an environment of the secure enclave of the server.

5. The method of claim 1, further comprising verifying a hash value of the application, wherein the verifying comprises:

comparing the hash value of the application to one or more known hash values, wherein each of the one or more known hash values is based on program code of a respective application to which a respective tag has been assigned.

6. The method of claim 5, wherein the hash value of the application is signed by the application, and wherein verifying the hash value of the application further comprises verifying a signature of the hash value of the application.

7. The method of claim 1, wherein enrolling, at the enclave manager, the secure enclave of the server comprises:

receiving, at the enclave manager, an attestation that the secure enclave of the server provides a secure cryptographic environment for executing applications.

8. A system comprising:

a memory; and a processing device, operatively coupled with the memory, to perform operations comprising:

enrolling, at an enclave manager, a secure enclave of a server, wherein the enclave manager manages a plurality of enrolled secure enclaves, and wherein one or more secure enclaves of the plurality of enrolled secure enclaves are available for executing applications;

receiving, via a graphical user interface of the enclave manager, a request to execute an application at the secure enclave of the server, wherein the graphical user interface comprises:

a respective identifier of each of the plurality of enrolled secure enclaves, a respective identifier of each of one or more applications that are available to be executed by the one or more secure enclaves of the plurality of enrolled secure enclaves, and a respective geographical location tag corresponding to each of the one or more applications;

receiving, via the graphical user interface, an indication of a geographical location tag associated with the application;

determining whether an attribute of the server satisfies the geographical location tag associated with the application; and in response to determining that the attribute of the server satisfies the geographical location tag associated with the application, providing, by the enclave manager, an indication to execute the application at the secure enclave of the server.

9. The system of claim 8, wherein to determine whether the attribute of the server satisfies the geographical location tag associated with the application, the processing device is further to:

determine a geographical location of the server based on the attribute of the server; and determine whether the geographical location of the server matches the geographical location corresponding to the geographical location tag.

10. The system of claim 8, wherein to provide the indication to execute the application at the secure enclave of the server, the processing device is further to:

provide a certificate to the application, the certificate comprising an identity of the enclave manager and a public key associated with the enclave manager.

11. The system of claim 8, the operations further comprising verifying a hash value of the application, wherein the verifying comprises:

comparing the hash value of the application to one or more known hash values, wherein each of the one or more known hash values is based on program code of a respective application to which a respective tag has been assigned.

12. The system of claim 11, wherein the hash value of the application is signed by the application, and wherein verifying the hash value of the application further comprises verifying a signature of the hash value of the application.

13. The system of claim 8, wherein the operations further comprise:

prior to receiving the request to execute the application at the secure enclave of the server, receiving the application at the enclave manager; and modifying the application to be compatible with an environment of the secure enclave of the server.

14. The system of claim 8, wherein to enroll, at the enclave manager, the secure enclave of the server, the processing device is further to:

receive, at the enclave manager, an attestation that the secure enclave of the server provides a secure cryptographic environment for executing applications.

15. A non-transitory computer readable medium comprising data that, when accessed by a processing device, cause the processing device to perform operations comprising:

enrolling, at an enclave manager, a secure enclave of a server, wherein the enclave manager manages a plurality of enrolled secure enclaves, and wherein one or more secure enclaves of the plurality of enrolled secure enclaves are available for executing applications;

receiving, via a graphical user interface of the enclave manager, a request to execute an application at the secure enclave of the server, wherein the graphical user interface comprises:

a respective identifier of each of the plurality of enrolled secure enclaves, a respective identifier of each of one or more applications that are available to be executed by the one or more secure enclaves of the plurality of enrolled secure enclaves, and a respective geographical location tag corresponding to each of the one or more applications;

receiving, via the graphical user interface, an indication of a geographical location tag associated with the application;

determining whether an attribute of the server satisfies the geographical location tag associated with the application; and in response to determining that the attribute of the server satisfies the geographical location tag associated with the application, providing, by the enclave manager, an indication to execute the application at the secure enclave of the server.

16. The non-transitory computer readable medium of claim 15, wherein to determine whether the attribute of the server satisfies the geographical location tag associated with the application, the operations further comprise:

determining a geographical location of the server based on the attribute of the server; and determining whether the geographical location of the server matches the geographical location corresponding to the geographical location tag.

17. The non-transitory computer readable medium of claim 15, wherein to provide the indication to execute the application at the secure enclave of the server, the operations further comprise:

providing a certificate to the application, the certificate comprising an identity of the enclave manager and a public key associated with the enclave manager.

18. The non-transitory computer readable medium of claim 15, the operations further comprising verifying a hash value of the application, wherein the verifying comprises:

comparing the hash value of the application to one or more known hash values, wherein each of the one or more known hash values is based on program code of a respective application to which a respective tag has been assigned.

19. The non-transitory computer readable medium of claim 18, wherein the hash value of the application is signed by the application, and wherein verifying the hash value of the application further comprises verifying a signature of the hash value of the application.

20. The non-transitory computer readable medium of claim 15, wherein to enroll, at the enclave manager, the secure enclave of the server, the operations further comprise:

receiving, at the enclave manager, an attestation that the secure enclave of the server provides a secure cryptographic environment for executing applications.

* * * * *